(12) United States Patent
Kim et al.

(10) Patent No.: US 10,153,819 B2
(45) Date of Patent: Dec. 11, 2018

(54) APPARATUS AND METHOD FOR TRANSMITTING/RECEIVING REFERENCE SIGNAL IN WIRELESS COMMUNICATION SYSTEM SUPPORTING BEAM FORMING SCHEME

(71) Applicant: Samsung Electronics Co., Ltd., Gyeonggi-do (KR)

(72) Inventors: Tae-Young Kim, Gyeonggi-do (KR); Jeong-Ho Park, Seoul (KR); Ji-Yun Seol, Gyeonggi-do (KR); Hyun-Kyu Yu, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 14/266,582

(22) Filed: Apr. 30, 2014

(65) Prior Publication Data

US 2014/0323144 A1  Oct. 30, 2014

(30) Foreign Application Priority Data

Apr. 30, 2013 (KR) .......... 10-2013-0048164

(51) Int. Cl.
  *H04B 7/06* (2006.01)
  *H04B 7/04* (2017.01)
  *H04B 7/0408* (2017.01)

(52) U.S. Cl.
  CPC ......... *H04B 7/0617* (2013.01); *H04B 7/0408* (2013.01); *H04B 7/0632* (2013.01)

(58) Field of Classification Search
  CPC .... H04B 7/0408; H04B 7/061; H04B 7/0617; H04B 7/0632; H04B 7/0684;
  (Continued)

(56) References Cited

U.S. PATENT DOCUMENTS 6,330,460 B1 * 12/2001 Wong .............. H01Q 1/246
                                                         455/517
2007/0121538 A1 * 5/2007 Ode .............. H04L 5/0048
                                                         370/323
(Continued)

FOREIGN PATENT DOCUMENTS

KR    20110017628 A    2/2011
KR    20130025102 A    3/2013
(Continued)

OTHER PUBLICATIONS

International Search Report dated Aug. 7, 2014 in connection with PCT/KR2014/003835; Samsung Electronics Co., Ltd.; 3 pages.
(Continued)

*Primary Examiner* — Michael Y Mapa

(57) ABSTRACT

A method for transmitting by a reference signal transmitting apparatus a reference signal in a wireless communication system supporting a beam forming scheme is provided. The method includes transmitting beam pattern measurement window indication information including information related to at least two beam pattern measurement windows which each of reference signal receiving apparatuses will use to the reference signal receiving apparatuses; and transmitting reference signals based on beam patterns which the reference signal transmitting apparatus supports during a preset number of time units.

10 Claims, 7 Drawing Sheets

(58) Field of Classification Search
CPC ... H04B 17/309; H04L 5/0023; H04L 5/0048; H04L 5/005; H04L 5/0078; H04W 64/006
USPC ........ 455/13.3, 24–25, 63.4, 67.11, 69, 101, 455/277.1, 418, 450–452.1, 504, 455/575.2–575.3, 575.5, 575.7, 455/561–562.1; 370/334, 252; 375/260, 375/267, 299, 295, 340; 343/700
See application file for complete search history.

(56) References Cited

U.S. PATENT DOCUMENTS

| | | | | |
|---|---|---|---|---|
| 2010/0210227 | A1* | 8/2010 | Hwang | H04B 7/0671 455/101 |
| 2010/0265853 | A1* | 10/2010 | Song | H01Q 3/2647 370/280 |
| 2012/0188936 | A1 | 7/2012 | Ji et al. | |
| 2013/0059619 | A1 | 3/2013 | Kim et al. | |
| 2013/0072247 | A1 | 3/2013 | Park et al. | |
| 2013/0279356 | A1* | 10/2013 | Park | H04W 24/02 370/252 |
| 2014/0140315 | A1 | 5/2014 | Kim et al. | |

FOREIGN PATENT DOCUMENTS

| | | |
|---|---|---|
| KR | 20130030404 A | 3/2013 |
| KR | 10-2013-0068868 | 6/2013 |
| WO | 2005-062496 A1 | 7/2005 |
| WO | WO 2013024997 A | 2/2013 |

OTHER PUBLICATIONS

Written Opinion of International Search Authority dated Aug. 7, 2014 in connection with PCT/KR2014/003835; Samsung Electronics Co., Ltd.; 5 pages.

ZTE; "Discussion on Scenarios of 3D Beamforming and Massive MIMO"; R1-130140; 3GPP TSG RAN WG1 Meeting #72; St. Julian's, Malta; Jan. 28-Feb. 1, 2013; 3 pages.

European Patent Office, "Supplementary European Search Report," Application No. 14791624.1-1874, dated Nov. 14, 2016, 8 pages, publisher EPO, Munich, Germany.

* cited by examiner

APPARATUS AND METHOD FOR TRANSMITTING/RECEIVING REFERENCE SIGNAL IN WIRELESS COMMUNICATION SYSTEM SUPPORTING BEAM FORMING SCHEME

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Apr. 30, 2013 assigned Serial No. 10-2013-0048164, the entire disclosure of which is incorporated herein by reference.

TECHNICAL FIELD

The present disclosure relates to an apparatus and method for transmitting/receiving a signal in a wireless communication system supporting a beam forming scheme. More particularly, the present disclosure relates to an apparatus and method for transmitting/receiving a reference signal in a wireless communication system supporting a beam forming scheme.

BACKGROUND

A wireless communication system has evolved to support a high data rate in order to satisfy a demand for wireless data traffic which continuously increases.

A 4th generation (4G) wireless communication system has developed various schemes to enhance an spectral efficiency for increasing a data rate, however, it is difficult to satisfy a wireless data traffic demand which remarkably increases using only the various schemes.

So, various schemes to satisfy the wireless data traffic demand which remarkably increases have been proposed, and a typical scheme is a scheme which uses a very wide frequency band, i.e., a ultra-wideband frequency.

In a frequency band (<5 GHz) which a mobile communication cellular system currently uses, it is very difficult to guarantee a wide frequency band, so there is a need for guaranteeing a ultra-wideband frequency at a frequency band which is higher than the frequency band which the mobile communication cellular system currently uses.

In a conventional wireless communication system, the higher a transmission frequency used for a wireless communication becomes, the more increased propagation path loss becomes. Due to this propagation path loss, a wave propagation distance becomes relatively short, this results in decreasing a service coverage.

So, various schemes for solving a service coverage decrease due to an increase of propagation path loss, i.e., various schemes for mitigating propagation path loss and increasing a propagation distance have been proposed, and a typical scheme is a beam forming scheme.

A detailed description of the beam forming scheme will be followed.

The beam forming scheme is classified into a transmission beam forming scheme and a reception beam forming scheme, and the transmission beam forming scheme and the reception beam forming scheme will be described below.

Firstly, the transmission beam forming scheme is a scheme that centers a signal transmitted through each of a plurality of antennas on a specific direction. Here, a set of the plurality of antennas is called an "array antenna", and each of the plurality of antennas included in the array antenna is called an "antenna element". If the transmission beam forming scheme is used, a propagation distance of a signal may be increased, and a signal is not almost transmitted in other direction other than a related direction. So, an interference which affects other user equipments (UEs) other than a related UE which receives the signal is remarkably decreased.

Secondly, the reception beam forming scheme is a scheme that centers a reception of a wave using an array antenna on a specific direction to increase a sensitivity of a signal which is received from a related direction, exclude a signal which is received in a direction other than the specific direction from a signal which a UE should receive, and block an interference signal.

The higher a transmission frequency used for transmitting a signal becomes, the shorter a wave length of a wave becomes. If an antenna is configured at half-wave length intervals, an antenna array may be configured in order to include more element antennas within the same area. So, a wireless communication system which operates in a high frequency band may acquire an antenna gain which is relatively high compared to a wireless communication system which uses a beam forming scheme in a low frequency band. The beam forming scheme may be more advantageous in a high frequency band.

In a current wireless communication system, it is well known that a relatively high antenna gain may be acquired using a beam forming scheme, however, there is no scheme for measuring a channel quality using the beam forming scheme and feeding back the measured channel quality.

SUMMARY

To address the above-discussed deficiencies, it is a primary object to provide an apparatus and method for transmitting/receiving a signal in a wireless communication system supporting a beam forming scheme.

Another aspect of the present disclosure is to provide an apparatus and method for transmitting/receiving a reference signal in a wireless communication system supporting a beam forming scheme.

Another aspect of the present disclosure is to provide an apparatus and method for transmitting/receiving a reference signal in a wireless communication system supporting a beam forming scheme thereby enabling adaptive channel quality measurement.

Another aspect of the present disclosure is to provide an apparatus and method for transmitting/receiving a reference signal in a wireless communication system supporting a beam forming scheme thereby enabling adaptive channel quality feedback.

Another aspect of the present disclosure is to provide an apparatus and method for transmitting/receiving a reference signal by considering a UE environment in a wireless communication system supporting a beam forming scheme.

Another aspect of the present disclosure is to provide an apparatus and method for transmitting/receiving a reference signal in a wireless communication system supporting a beam forming scheme thereby a reference signal transmitting apparatus or a reference signal receiving apparatus adaptively determines a beam pattern measurement window.

In accordance with an aspect of the present disclosure, a reference signal transmitting apparatus in a wireless communication system supporting a beam forming scheme is provided. The a reference signal transmitting apparatus includes a transmitter configured to transmit beam pattern measurement window indication information including information related to at least two beam pattern measurement windows which each of reference signal receiving apparatuses will use to the reference signal receiving apparatuses, and transmit reference signals based on beam patterns which the reference signal transmitting apparatus supports during a preset number of time units.

In accordance with another aspect of the present disclosure, a reference signal receiving apparatus in a wireless communication system supporting a beam forming scheme is provided. The reference signal receiving apparatus includes a receiver configured to receive beam pattern measurement window indication information including information related to at least two beam pattern measurement windows which the reference signal receiving apparatus will use from a reference signal transmitting apparatus, and receive reference signals transmitted from the reference signal transmitting apparatus using beam pattern measurement windows corresponding to the beam pattern measurement window indication information during a preset number of time units.

In accordance with another aspect of the present disclosure, a reference signal transmitting apparatus in a wireless communication system supporting a beam forming scheme is provided. The reference signal transmitting apparatus includes a receiver configured to receive beam pattern measurement window indication information including information related to at least two beam pattern measurement windows which a reference signal receiving apparatus will use from the reference signal receiving apparatus; and a transmitter configured to transmit reference signals based on beam patterns which the reference signal transmitting apparatus supports during a preset number of time units.

In accordance with another aspect of the present disclosure, a reference signal receiving apparatus in a wireless communication system supporting a beam forming scheme is provided. The reference signal receiving apparatus includes a transmitter configured to transmit beam pattern measurement window indication information including information related to at least two beam pattern measurement windows which a reference signal receiving apparatus will use to a reference signal transmitting apparatus; and a receiver configured to receive reference signals transmitted from the reference signal transmitting apparatus using beam pattern measurement windows corresponding to the beam pattern measurement window indication information during a preset number of time units.

In accordance with another aspect of the present disclosure, a method for transmitting by a reference signal transmitting apparatus a reference signal in a wireless communication system supporting a beam forming scheme is provided. The method includes transmitting beam pattern measurement window indication information including information related to at least two beam pattern measurement windows which each of reference signal receiving apparatuses will use to the reference signal receiving apparatuses; and transmitting reference signals based on beam patterns which the reference signal transmitting apparatus supports during a preset number of time units.

In accordance with another aspect of the present disclosure, a method for receiving by a reference signal receiving apparatus a reference signal in a wireless communication system supporting a beam forming scheme is provided. The method includes receiving beam pattern measurement window indication information including information related to at least two beam pattern measurement windows which the reference signal receiving apparatus will use from a reference signal transmitting apparatus; and receiving reference signals transmitted from the reference signal transmitting apparatus using beam pattern measurement windows corresponding to the beam pattern measurement window indication information during a preset number of time units.

In accordance with another aspect of the present disclosure, a method for transmitting by a reference signal transmitting apparatus a reference signal in a wireless communication system supporting a beam forming scheme is provided. The method includes receiving beam pattern measurement window indication information including information related to at least two beam pattern measurement windows which a reference signal receiving apparatus will use from the reference signal receiving apparatus; and transmitting reference signals based on beam patterns which the reference signal transmitting apparatus supports during a preset number of time units.

In accordance with another aspect of the present disclosure, a method for receiving by a reference signal receiving apparatus a reference signal in a wireless communication system supporting a beam forming scheme is provided. The method includes transmitting beam pattern measurement window indication information including information related to at least two beam pattern measurement windows which a reference signal receiving apparatus will use to a reference signal transmitting apparatus; and receiving reference signals transmitted from the reference signal transmitting apparatus using beam pattern measurement windows corresponding to the beam pattern measurement window indication information during a preset number of time units.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document; the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such, a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
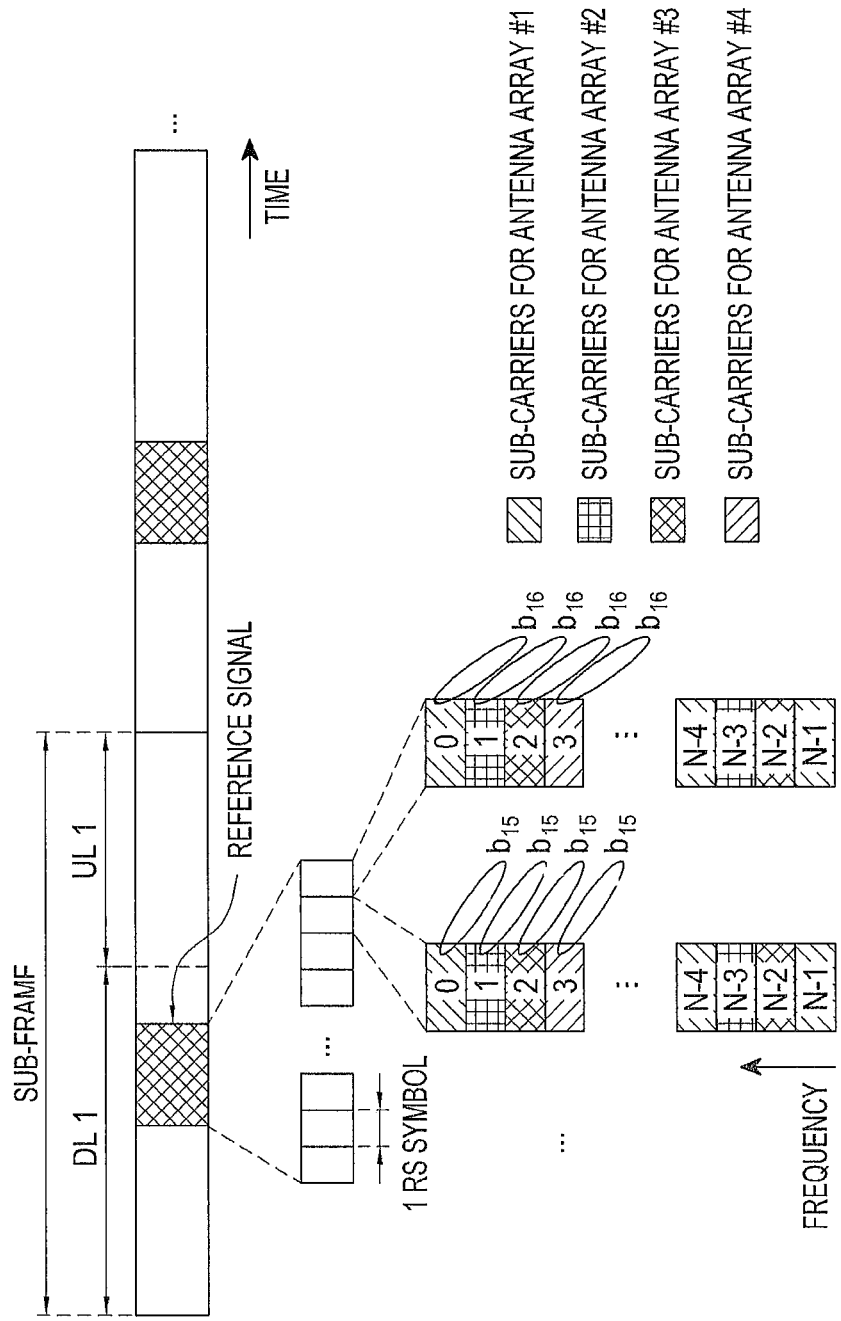
FIG. 1 schematically illustrates a process of transmitting a reference signal in a microwave band-beam forming mobile communication system according to an embodiment of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

An embodiment of the present disclosure proposes an apparatus and method for transmitting/receiving a signal in a wireless communication system supporting a beam forming scheme.

An embodiment of the present disclosure proposes an apparatus and method for transmitting/receiving a reference signal in a wireless communication system supporting a beam forming scheme.

An embodiment of the present disclosure proposes an apparatus and method for transmitting/receiving a reference signal in a wireless communication system supporting a beam forming scheme thereby enabling adaptive channel quality measurement.

An embodiment of the present disclosure proposes an apparatus and method for transmitting/receiving a reference signal in a wireless communication system supporting a beam forming scheme thereby enabling adaptive channel quality feedback.

An embodiment of the present disclosure proposes an apparatus and method for transmitting/receiving a reference signal by considering a user equipment (UE) environment in a wireless communication system supporting a beam forming scheme.

An embodiment of the present disclosure proposes an apparatus and method for transmitting/receiving a reference signal in a wireless communication system supporting a beam forming scheme thereby a reference signal transmitting apparatus or a reference signal receiving apparatus adaptively enables to determine a beam pattern measurement window.

A method and apparatus proposed in various embodiments of the present disclosure may be applied to various communication systems such as a long term evolution (LTE) system, an LTE-advanced (LTE-A) system, a high speed downlink packet access (HSDPA) mobile communication system, a high speed uplink packet access (HSUPA) mobile communication system, a high rate packet data (HRPD)

mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) mobile communication system, an evolved packet system (EPS), a mobile internet protocol (Mobile IP) system, and/or the like.

An embodiment of the present disclosure considers for using a beam forming scheme which is based on an analog beam forming scheme and a hybrid beam forming scheme which is based on a digital pre-coding scheme in order to acquire an antenna gain as high as possible. The digital pre-coding scheme is typically used for acquiring data rate as high as possible in a multiple antenna system.

In the hybrid beam forming scheme, a reference signal transmitting apparatus forms a beam using an analog beam forming scheme, and transmits a signal by applying a digital pre-coding scheme similar to a digital pre-coding scheme which is applied to a conventional multiple antenna in a base band in a case that more than one analog beam is formed. So, if the hybrid beam forming scheme is used, the reference signal transmitting apparatus may expect to more reliably receive a reference signal and acquire higher system capacity compared to a case that the hybrid beam forming scheme is not used.

An embodiment of the present disclosure proposes an apparatus and method for transmitting/receiving a reference signal in order to determine an analog beam which a user equipment (UE) prefers and measure a channel quality in a wireless communication system, e.g., a mobile communication system which is based on a microwave band-beam forming scheme.

A process of transmitting a reference signal in a microwave band-beam forming mobile communication system according to an embodiment of the present disclosure will be described with reference to FIG. 1.

FIG. 1 schematically illustrates a process of transmitting a reference signal in a microwave band-beam forming mobile communication system according to an embodiment of the present disclosure.

Referring to FIG. 1, one sub-frame used in the microwave band-beam forming mobile communication system includes a downlink sub-frame and a uplink sub-frame. The downlink sub-frame includes a reference signal region through a reference signal is transmitted, and the reference signal region includes a plurality of reference signal symbols. In the microwave band-beam forming mobile communication system, for data transmission, an analog beam format and a digital codebook are selected. Here, the analog beam format is selected using the reference signal, and a channel quality is also measured using the reference signal.

So, the reference signal for measuring the channel quality and selecting the analog beam format is transmitted through a resource which is orthogonal at a frequency axis and a time axis per array antenna and analog beam as illustrated in FIG. 1.

The process of transmitting the reference signal in FIG. 1 indicates a process of transmitting a reference signal in a case that 4 array antennas and 16 analog beam formats are used. So, one reference signal region includes 16 reference signal symbols, and reference signals corresponding to 4 array antennas are transmitted using sub-carriers which are orthogonal one another on 1 reference signal symbol. In FIG. 1, N denotes the number of sub-carries used for transmitting the reference signal.

As illustrated in FIG. 1, if a reference signal transmitting apparatus transmits the reference signal, a reference signal receiving apparatus may measure a channel quality for each of analog beam patterns and array antennas which the microwave band-beam forming mobile communication system supports.

A process of transmitting a reference signal in a microwave band-beam forming mobile communication system according to an embodiment of the present disclosure has been described with reference to FIG. 1, and an inner structure of a reference signal transmitting apparatus in a microwave band-beam forming mobile communication system according to an embodiment of the present disclosure will be described with reference to FIG. 2.

Figure 2:
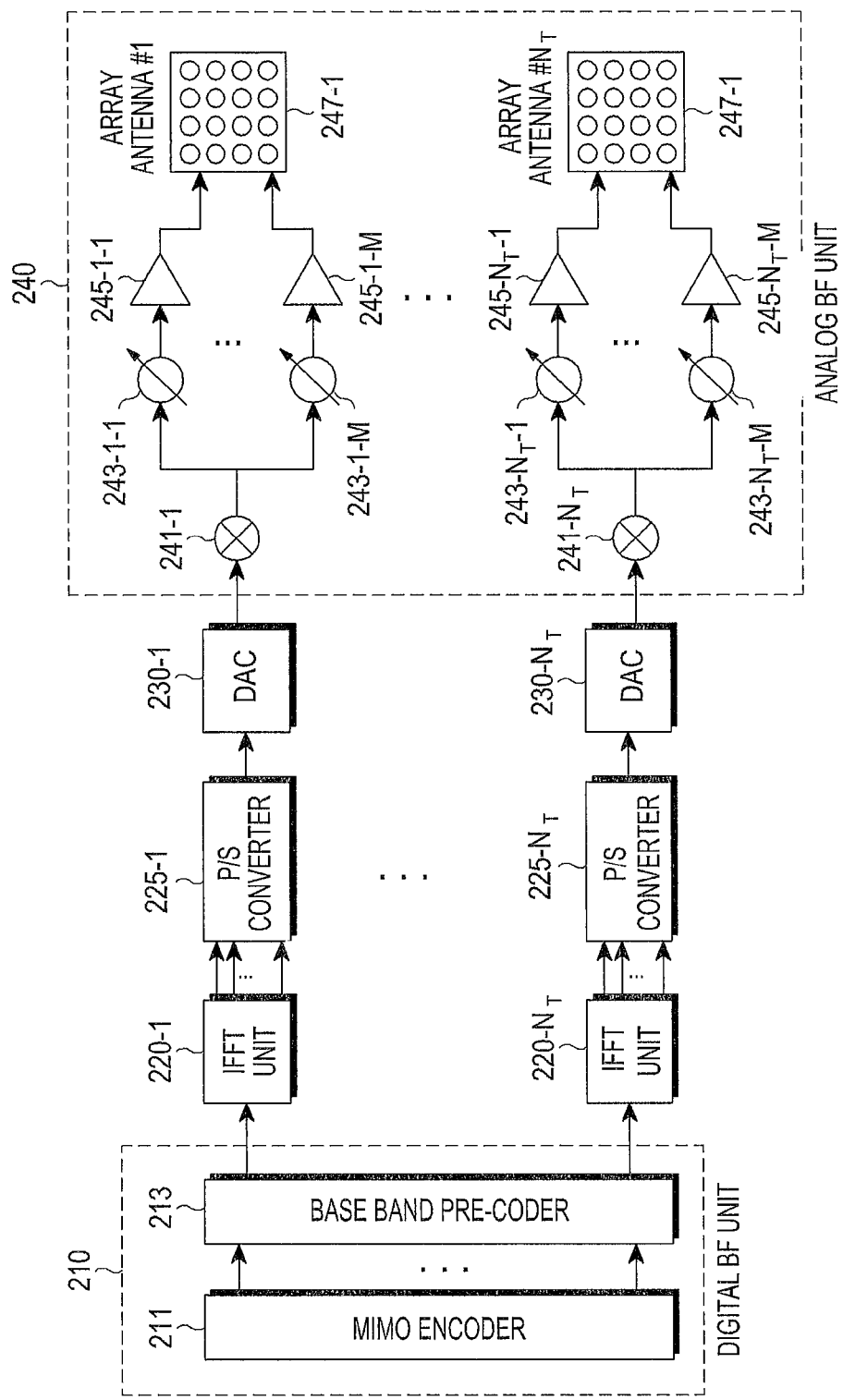
FIG. 2 schematically illustrates an inner structure of a reference signal transmitting apparatus in a microwave band-beam forming mobile communication system according to an embodiment of the present disclosure.

FIG. 2 schematically illustrates an inner structure of a reference signal transmitting apparatus in a microwave band-beam forming mobile communication system according to an embodiment of the present disclosure.

Referring to FIG. 2, the reference signal transmitting apparatus includes a digital beam forming (BF) unit 210, a plurality of inverse fast fourier transformation (IFFT) units, e.g., $N_T$ units, i.e., an IFFT unit 220-1, . . . , an IFFT unit 220-$N_T$, a plurality of parallel to serial (P/S) converters, e.g., $N_T$ P/S converters, i.e., a P/S converter 225-1, . . . , a P/S converter 225-$N_T$, a plurality of digital to analog converters (DACs), e.g., $N_T$ DACs, i.e., a DAC 230-1, . . . , a DAC 230-$N_T$, and an analog beam forming unit 240. Here, $N_T$ denotes the number of array antennas which the reference signal transmitting apparatus uses.

The digital BF unit 210 includes a multiple input multiple output (MIMO) encoder 211, and a base band pre-coder 213.

The analog beam forming unit 240 includes a plurality of mixers, e.g., $N_T$ mixers, i.e., a mixer 241-1, . . . , a mixer 241-$N_T$, a plurality of phase shifters, e.g., $N_T$ phase shifters, i.e., a phase shifter 243-1-1, . . . , a phase shifter 243-1-$N_T$, a plurality of power amplifiers (PAs), e.g., $N_T \times M$ PAs, i.e., a PA 245-1-1, . . . , a PA 245-1-$N_T$, and a plurality of antenna arrays, e.g., $N_T$ antenna arrays, i.e., an antenna array 247-1, . . . , an antenna array 247-$N_T$. Here, M denotes the number of element antennas included in one antenna array.

As illustrated in FIG. 2, the reference signal transmitting apparatus includes NT array antennas, and one array antenna includes M element antennas and transmits a reference signal using a beam forming scheme.

Each array antenna may form an analog beam for all directions within a service coverage, and an analog beam direction may be previously determined. So, a reference signal transmitting apparatus transmits reference signals to which the previously determined analog beam patterns are applied thereby each of all UEs may select an analog beam pattern appropriate for each of all UEs.

In FIG. 2, the reference signal transmitting apparatus includes a plurality of array antennas and may form analog beams per array antenna. So, the reference signal transmitting apparatus selects an analog beam pattern per array antenna. As described in FIG. 1, the reference signal transmitting apparatus allocates a resource through which a reference signal will be transmitted in order that reference signals may be mutually orthogonal per array antenna as well as analog beam. The reference signal transmitting apparatus uses a plurality of array antennas as well as a plurality of beam patterns, so the reference signal transmitting apparatus may use a digital pre-coding scheme in a base band. In FIG. 2, the reference signal transmitting apparatus uses $N_T$ array antennas, and may apply a digital pre-coding scheme which a related UE prefers among $N_T$ dimensions of digital code book. So, the reference signal transmitting apparatus may determine a digital pre-coding scheme by transmitting reference signals as described in FIG. 1.

While the BF unit 210, the $N_T$ units, i.e., the IFFT unit 220-1, . . . , the IFFT unit 220-$N_T$, the $N_T$ P/S converters, i.e., the P/S converter 225-1, . . . , the P/S converter 225-$N_T$, the $N_T$ DACs, i.e., the DAC 230-1, . . . , the DAC 230-$N_T$, and the analog beam forming unit 240 are shown in FIG. 2 as separate units, it is to be understood that this is merely for convenience of description. In other words, two or more of the BF unit 210, the $N_T$ units, i.e., the IFFT unit 220-1, . . . , the IFFT unit 220-$N_T$, the $N_T$ P/S converters, i.e., the P/S converter 225-1, . . . , the P/S converter 225-$N_T$, the $N_T$ DACs, i.e., the DAC 230-1, . . . , the DAC 230-$N_T$, and the analog beam forming unit 240 may be incorporated into a single unit.

In order to maximize system capacity of the microwave band-beam forming mobile communication system, the reference signal transmitting apparatus should allocate a minimum resource used for transmitting a reference signal necessary for determining an analog beam pattern and a digital pre-coding scheme. As described above, the reference signal transmitting apparatus allocates a resource which is orthogonal in a time/frequency domain for each array antenna and analog beam in order to transmit a reference signal, so a rate of resources which are used for transmitting the reference signal increases according that the number of array antennas and the number of analog beam patterns increase. This may result in decreasing system capacity of the microwave band-beam forming mobile communication system.

Here, important elements which affect the number of analog beam patterns includes an analog beam width used for data transmission, a radius of a service coverage, an azimuth angle range which one sector supports, an array antenna structure, and the like, and the detailed description will be followed.

An analog beam width used for data transmission is related to the number of element antennas included in an antenna array. For example, if the antenna array is configured to include a relatively large number of element antennas, an analog beam is formed in order to have a relatively narrow analog beam width. If data is transmitted using an analog beam which has a relatively narrow analog beam width and a service azimuth angle is fixed, the relatively large number of analog beams are necessary in order to equally support all directions. If a radius of a service coverage increases, a propagation path loss increases, so there is a need for a relatively high antenna gain in order to provide the same quality of service in the microwave band-beam forming mobile communication system. That is, in order to acquire the relatively high antenna gain, there is a need for an antenna array which includes the relatively large number of element antennas, so there is a need for a relatively narrow analog beam width and the relatively large number of analog beams. Like this, if an azimuth angle range which one sector supports becomes wide, there is a need for the relatively large number of analog beams.

Figure 3:
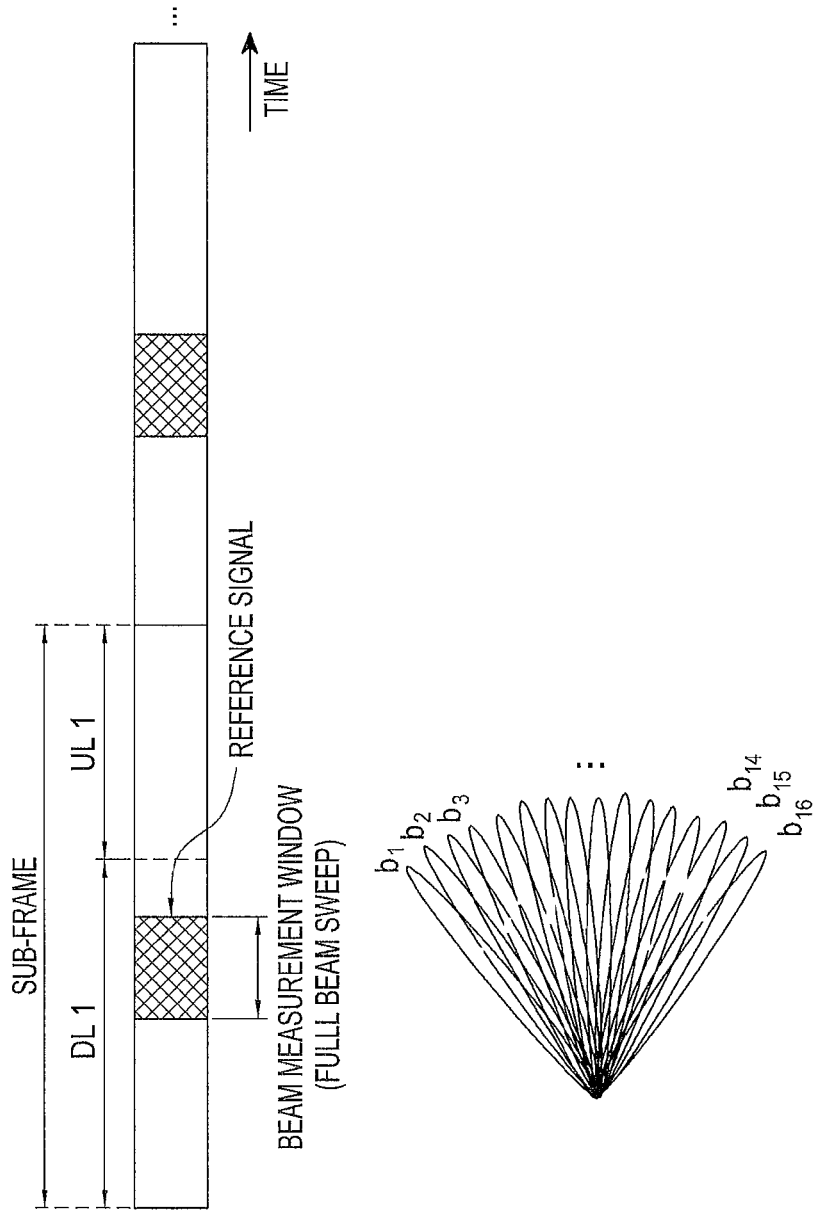
FIG. 3 schematically illustrates an example of a process of transmitting and receiving a reference signal in a microwave band-beam forming mobile communication system according to an embodiment of the present disclosure.

A process of transmitting and receiving a reference signal in a microwave band-beam forming mobile communication system according to an embodiment of the present disclosure will be descried with reference to FIG. 3.

FIG. 3 schematically illustrates an example of a process of transmitting and receiving a reference signal in a microwave band-beam forming mobile communication system according to an embodiment of the present disclosure.

Referring to FIG. 3, it will be noted that a process of transmitting and receiving a reference signal in FIG. 3 is a process of transmitting and receiving a reference signal by considering relative short feedback latency.

A reference signal transmitting apparatus allocates a resource which is orthogonal in a frequency/time region for all array antennas and analog beam patterns in each sub-frame. The resource used for transmitting the reference signal is allocated in the same manner in FIG. 1. In this case, in a structure of the reference signal transmitting apparatus in FIG. 2, the number of orthogonal sub-carrier candidate resources which may be maximally allocated within the same reference signal symbol is equal to a maximum array antenna number.

In FIG. 3, it will be assumed that the reference signal transmitting apparatus uses 16 analog beam patterns, in this case, a beam pattern measurement window includes 16 reference signal symbols within one sub-frame. Further, sub-carrier resources are allocated within one reference signal symbol in order that the sub-carrier resources are orthogonal per array antenna. Here, a sub-frame denotes one uplink (UL)/downlink (DL) data transmission interval pair (DL1, UL1) in a time division duplex (TDD) system. That is, in the microwave band-beam forming mobile communication system, minimum feedback delay time is one sub-frame. That is, the beam pattern measurement window denotes a time interval which is used for transmitting reference signals in the reference signal transmitting apparatus.

The beam pattern measurement window denotes a time interval during which a reference signal receiving apparatus measures beam patterns, and the reference signal receiving apparatus receives reference signals which are transmitted from a reference signal transmitting apparatus during the beam pattern measurement window to measure the beam patterns. The beam pattern measurement window may be implemented with various forms, and the number of beam pattern measurement windows which the reference signal receiving apparatus will use is not limited. That is, the reference signal receiving apparatus may use at least one beam pattern measurement window as necessary. In an embodiment of the present disclosure, it will be assumed that the reference signal receiving apparatus may use two beam pattern measurement windows.

In FIG. 3, a reference signal receiving apparatus may measure channel qualities for all array antennas and analog beams within one sub-frame, a process of collecting data for feeding back information on the measured channel qualities may be performed in each sub-frame. The channel quality information which is measured and collected in the reference signal receiving apparatus is transmitted to a reference signal transmitting apparatus according to a predetermined feedback transmission period. The feedback transmission period may be variously set according to a situation of a microwave band-beam forming mobile communication system. Further, the feedback transmission period is set in order that the channel quality information is effectively used, and a detailed description of an operation of determining the feedback transmission period will be omitted herein.

In a case that the process of transmitting and receiving the reference signal in FIG. 3 is considered, the reference signal receiving apparatus may increase total system capacity of the microwave band-beam forming mobile communication system by decreasing an error between channel quality information which the reference signal receiving apparatus measures using reference signals and channel quality information which the reference signal receiving apparatus experiences upon transmitting data since an operation of measuring channel quality and selecting an analog beam pattern is performed within one sub-frame.

If a relatively large number of analog beams are used, that is, a relatively narrow analog beam width is used or a relatively wide service coverage is supported, the process of transmitting the reference signal in FIG. 3 configures a beam pattern measurement window with a large number of reference signal symbols. This indicates that the number of data symbols which may be transmitted within one sub-frame decreases, and may result in decreasing total system capacity of the microwave band-beam forming mobile communication system.

An embodiment of the present disclosure proposes another method of transmitting and receiving a reference signal in which a UE adaptively measures a channel quality and feeds back channel quality information, and this will be described with reference to FIG. 4.

Figure 4:
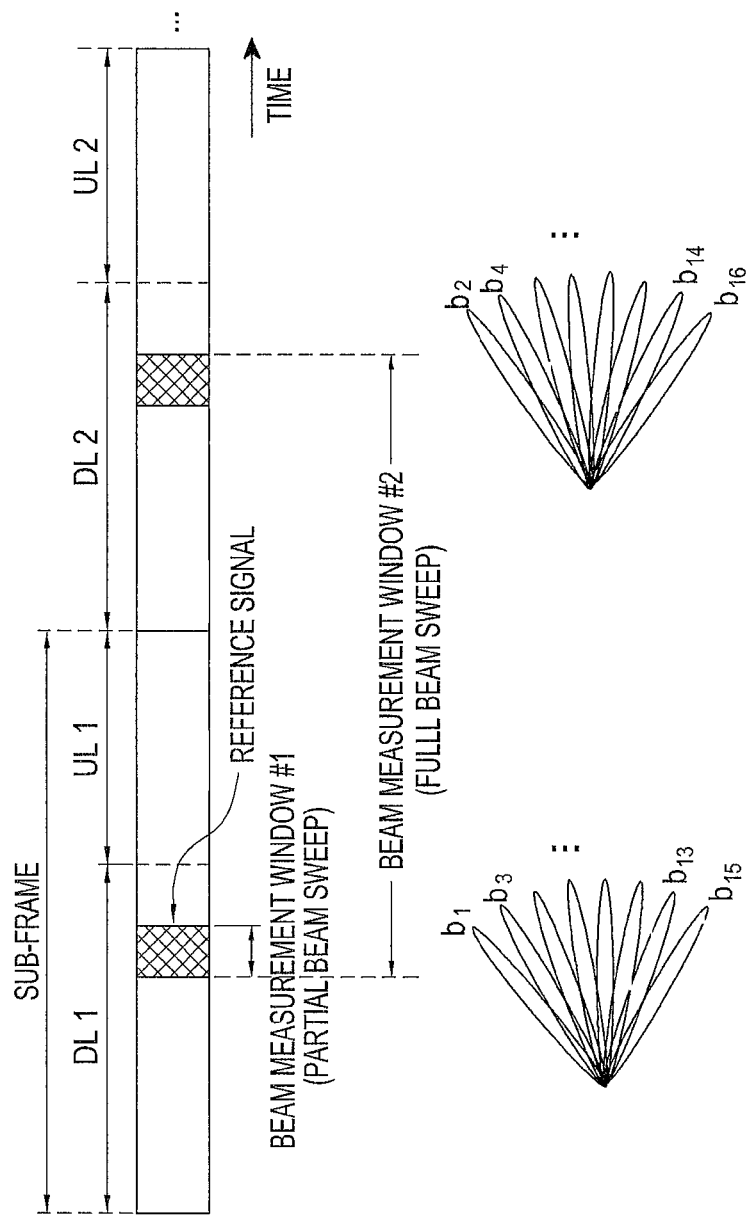
FIG. 4 schematically illustrates another example of a process of transmitting and receiving a reference signal in a microwave band-beam forming mobile communication system according to an embodiment of the present disclosure.

FIG. 4 schematically illustrates another example of a process of transmitting and receiving a reference signal in a microwave band-beam forming mobile communication system according to an embodiment of the present disclosure.

Prior to a description of FIG. 4, in a method of transmitting and receiving a reference signal in FIG. 3, the more increased quantity of a resource used for transmitting the reference signal becomes, the more increased a system overhead becomes. However, deference between a measured channel quality and a channel quality which is experienced on data transmission may be decreased. Even though the number of resources used for transmitting a reference signal increases due to the relatively large number of analog beams, there is a need for a method of transmitting and receiving the reference signal which may minimize a system overhead and enhance an accuracy of a measured channel quality.

Firstly, a method of transmitting a reference signal in a microwave band-beam forming mobile communication system will be described below.

Referring to FIG. 4, a reference signal transmitting apparatus allocates a sub-carrier resource which is orthogonal in a frequency/time domain for each of all array antennas and analog beam patterns during a plurality of sub-frames. A method of allocating a resource used for transmitting a reference signal in the reference signal transmitting apparatus is performed in the manner described with reference to FIG. 1 and a description thereof will be omitted herein.

In FIG. 4, it is assumed that a reference signal transmitting apparatus uses 16 analog beam patterns, and the reference signal transmitting apparatus transmits a reference signal corresponding to all analog beam patterns during two sub-frame intervals. Here, an analog beam pattern combination which is allocated to each sub-frame includes analog beam patterns in order that the reference signal transmitting apparatus may support all directions in which the reference signal transmitting apparatus supports a service. This method of allocating a beam per sub-frame denotes an analog beam pattern allocation criterion in a method for adaptively transmitting a reference signal proposed in an embodiment of the present disclosure.

In FIG. 4, for example, an analog beam pattern which is allocated to the first sub-frame is $\{b_1, b_3, \ldots, b_{15}\}$, the microwave band-beam forming mobile communication system may support a service coverage for all directions even though an angle range among neighbor analog beams is wide. Like this, an analog beam pattern which is allocated to the second sub-frame is $\{b_2, b_3, \ldots, b_{16}\}$, the microwave band-beam forming mobile communication system may support the service coverage for all directions even though the angle range among neighbor analog beams is wide.

Finally, a method of transmitting a reference signal proposed in an embodiment of the present includes a required criterion for an analog beam pattern combination configuration, and may be summarized as a method of transmitting reference signals during a plurality of sub-frame intervals.

Secondly, a method of receiving a reference signal in a microwave band-beam forming mobile communication system will be described below.

A reference signal receiving apparatus selects an analog beam pattern which a reference signal transmitting apparatus prefers using different schemes according to a plurality of beam pattern measurement windows, and measures a channel quality.

In FIG. 4, the reference signal receiving apparatus measures a channel quality using a beam pattern measurement window #2 in which reference signals for all analog beam patterns are included and a beam pattern measurement window #1 in which reference signals for a part of all analog beam patterns are included. A reference signal transmitting apparatus may notify the reference signal receiving apparatus of information on a beam pattern measurement window which the reference signal receiving apparatus will use among a plurality of beam pattern measurement windows, however, it will be understood by those of ordinary skill in the art that the reference signal receiving apparatus may directly select the beam pattern measurement window. If the reference signal receiving apparatus directly selects the beam pattern measurement window, the reference signal receiving apparatus transmits information on the selected beam pattern measurement window, i.e., beam pattern measurement window indication information to the reference signal transmitting apparatus. So, the reference signal transmitting apparatus may transmit a reference signal corresponding to the beam pattern measurement window indication information received from the reference signal receiving apparatus.

In an embodiment of the present disclosure, for convenience, it will be assumed that the reference signal transmitting apparatus determines a beam pattern measurement window, and transmits information on the determined beam pattern measurement window, i.e., beam pattern measurement window indication information to the reference signal receiving apparatus.

A method of determining a beam pattern measurement window which is appropriate for the reference signal receiving apparatus in the reference signal transmitting apparatus will be described below.

The reference signal transmitting apparatus may determine the beam pattern measurement window by considering various parameters, and a detailed description for this will be followed.

The reference signal transmitting apparatus may determine the beam pattern measurement window based on various parameters, e.g., a speed, a quality of service (QoS), a data type, and a billing level of a reference signal receiving apparatus, and the like. Here, the data type may include a real-time service data type, a non-real-time service data type, a user data type, and a non-user data type, e.g., a background control traffic type, and the like.

For example, an operation of determining the beam pattern measurement window according to the speed of the reference signal receiving apparatus will be described below.

For example, even though a reference signal receiving apparatus which moves at a relative low speed measures a channel quality during a beam pattern measurement window #2 in which reference signals for all analog beam patterns are included, the reference signal receiving apparatus may expect that a channel quality measurement error is relatively small.

Unlike this, if a reference signal receiving apparatus which moves at a relatively high speed measures a channel quality during the beam pattern measurement window #2, a channel quality change becomes increased, so the reference signal receiving apparatus may expect that a channel quality measurement error is relatively large. If the channel quality measurement error becomes increased, difference between a channel quality which the reference signal receiving apparatus experiences upon transmitting data and a channel quality of a reference signal which the reference signal receiving apparatus transmits to the reference signal transmitting apparatus may become increased, this may result in decreasing system capacity in a microwave band-beam forming mobile communication system. So, it is more effective that the reference signal receiving apparatus which moves at the relatively high speed measures a channel quality by selecting a relatively short beam pattern measurement window such as a beam pattern measurement window #1.

A relationship between a reference signal and a feedback signal in a microwave band-beam forming mobile communication system according to an embodiment of the present disclosure will be described with reference to FIG. 5.

Figure 5:
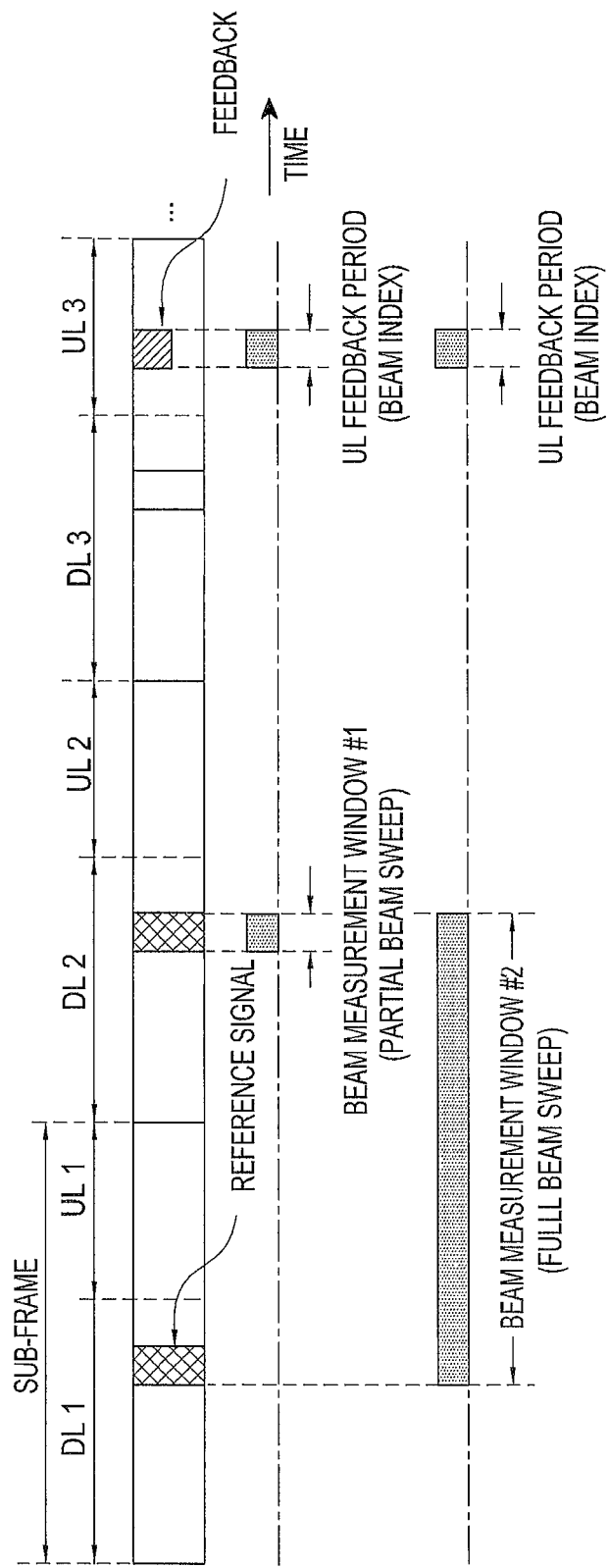
FIG. 5 schematically illustrates a relationship between a reference signal and a feedback signal in a microwave band-beam forming mobile communication system according to an embodiment of the present disclosure.

FIG. 5 schematically illustrates a relationship between a reference signal and a feedback signal in a microwave band-beam forming mobile communication system according to an embodiment of the present disclosure.

Referring to FIG. 5, a reference signal receiving apparatus measures a channel quality for a reference signal which a reference signal transmitting apparatus transmits during two beam pattern measurement windows to determine an analog beam pattern which the reference signal receiving apparatus prefers, and transmits information on the determined analog beam pattern in a uplink through a feedback signal.

In FIG. 5, it will be assumed that the reference signal transmitting apparatus commands the reference signal receiving apparatus to transmit a feedback signal during a UL3 interval or a predetermined feedback transmission period.

In FIG. 5, it is assumed that the reference signal receiving apparatus determines channel quality information which the reference signal receiving apparatus will feed back during time corresponding to at least one sub-frame interval in order to transmit a feedback signal through an uplink, and generates the feedback signal corresponding to the channel quality information.

As described in FIG. 5, the reference signal receiving apparatus should measure a channel quality during one sub-frame interval, and determine information on an analog beam pattern which the reference signal receiving apparatus prefers in order to transmit a feedback signal to a reference signal transmitting apparatus in a UL3 interval. If the reference signal receiving apparatus measures a channel quality using a beam patter measurement window #1, the reference signal receiving apparatus measures the channel quality using a reference signal which is transmitted during one sub-frame interval, and may select an analog beam pattern which the reference signal receiving apparatus prefers. Unlike this, if the reference signal receiving apparatus measures a channel quality using a beam pattern window #2, the reference signal receiving apparatus may measure a channel quality and select an analog beam pattern using reference signals which are transmitted during two sub-frame intervals.

In a microwave band-beam forming mobile communication system according to an embodiment of the present disclosure, an operation of a reference signal transmitting apparatus, e.g., a BS may be classified into an operation of transmitting a reference signal and an operation of transmitting beam pattern measurement indication information appropriate for a related reference signal receiving apparatus, e.g., a UE, and a detailed description for this will be described below.

(1) The BS transmits reference signals corresponding to all analog beam patterns during a plurality of sub-frames. The BS generates/allocates a channel measurement reference signal per sub-frame as analog beams in order to support all directions.

(2) The BS transmits beam pattern measurement window indication information appropriate for each UE based on various parameters, e.g., a speed, a QoS, a data type, and a billing level of a UE, and the like.

In a microwave band-beam forming mobile communication system according to an embodiment of the present disclosure, an operation of a reference signal receiving apparatus, e.g., a UE may be classified into an operation of receiving beam pattern measurement window indication information transmitted from a reference signal transmitting apparatus, e.g., a BS, an operation of measuring a channel quality during a beam pattern measurement window corresponding to the received beam pattern measurement window indication information and selecting an analog beam pattern which the UE prefers using the measured channel quality, and an operation of transmitting channel quality information indicating the measured channel quality to the BS according to the received feedback transmission period, and a detailed description for this will be described below.

(1) A UE receives beam pattern measurement window indication information transmitted from a BS, and determines a beam pattern measurement window through which the UE will receive a reference signal based on the received beam pattern measurement window indication information.

(2) a case that the beam pattern measurement window indication information indicates a beam pattern measurement window for all directional analog beam patterns Firstly, the UE determines an analog beam pattern which the UE prefers based on a reference signal which is transmitted during a plurality of sub-frames, and transmits channel quality information.

Secondly, the UE transmits channel quality information according to a feedback transmission period received from the BS.

(3) a case that the beam pattern measurement window indication information indicates a beam pattern measurement window for a part of directional analog beam patterns Firstly, the UE determines an analog beam pattern which the UE prefers based on reference signals transmitted during one sub-frame and transmits channel quality information.

Secondly, the UE transmits channel quality information according to a feedback transmission period received from the BS.

An operating process of a reference signal transmitting apparatus in a microwave band-beam forming mobile communication system according to an embodiment of the present disclosure will be described with reference to FIG. 6.

Figure 6:
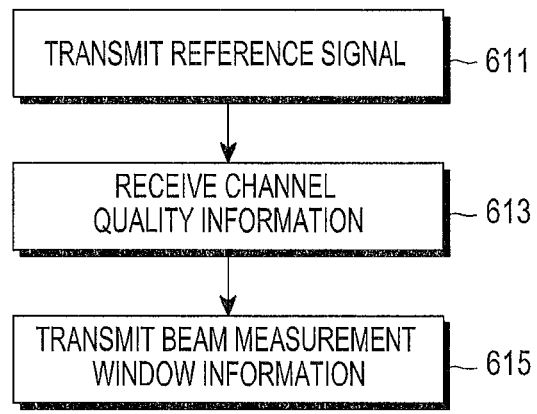
FIG. 6 illustrates an operating process of a reference signal transmitting apparatus in a microwave band-beam forming mobile communication system according to an embodiment of the present disclosure.

FIG. 6 illustrates an operating process of a reference signal transmitting apparatus in a microwave band-beam forming mobile communication system according to an embodiment of the present disclosure.

Referring to FIG. 6, the reference signal transmitting apparatus transmits reference signals corresponding to all analog beam patterns which the reference signal transmitting apparatus may support during a preset number of sub-frame intervals at operation 611. The preset number of sub-frame intervals may correspond to a beam pattern measurement window #1 in FIG. 4 and a beam pattern measurement window #1 in FIG. 5. The operation of transmitting a reference signal in the reference signal transmitting apparatus is performed in the manner described with reference to FIGS. 1 to 5 and a description thereof will be omitted herein.

The reference signal transmitting apparatus receives channel quality information for reference signal receiving apparatuses to which the reference signal transmitting apparatus provides a service from the reference signal receiving apparatuses at operation 613. The operation of receiving the channel quality information from the reference signal receiving apparatuses is performed in the manner described with reference to FIGS. 1 to 5 and a description thereof will be omitted herein.

The reference signal transmitting apparatus determines a beam pattern measurement window for each of the reference signal receiving apparatuses using the channel quality information received from the reference signal receiving apparatuses, and transmits beam pattern measurement window information indicating the determined beam pattern measurement window to the reference signal receiving apparatuses at operation 615. The operation of determining the beam pattern measurement window for each of the reference signal receiving apparatuses using the channel quality information received from the reference signal receiving apparatuses, and transmitting the beam pattern measurement window information indicating the determined beam pattern measurement window to the reference signal receiving apparatuses is performed in the manner described with reference to FIGS. 1 to 5 and a description thereof will be omitted herein.

Although FIG. 6 illustrates an operating process of a reference signal transmitting apparatus in a microwave band-beam forming mobile communication system according to an embodiment of the present disclosure, various changes could be made to FIG. 6. For example, although shown as a series of operations, various operations in FIG. 6 could overlap, occur in parallel, occur in a different order, or occur multiple times.

An operating process of a reference signal transmitting apparatus in a microwave band-beam forming mobile communication system according to an embodiment of the present disclosure has been described with reference to FIG. 6, and an operating process of a reference signal receiving apparatus in a microwave band-beam forming mobile communication system according to an embodiment of the present disclosure will be described with reference to FIG. 7.

Figure 7:
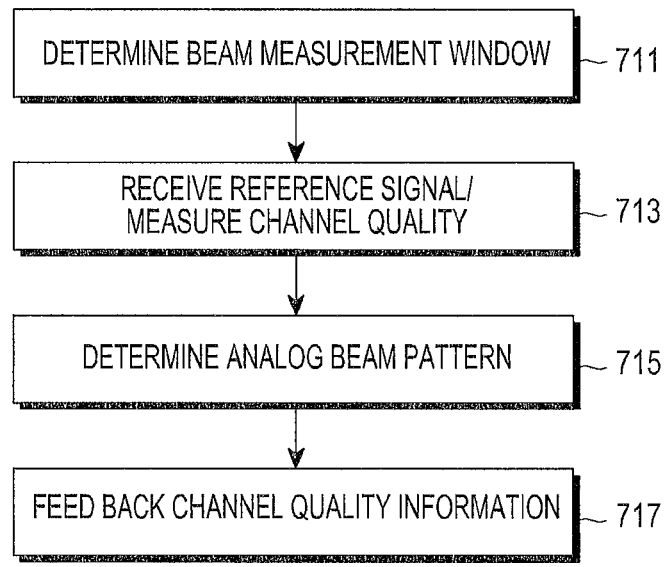
FIG. 7 illustrates an operating process of a reference signal receiving apparatus in a microwave band-beam forming mobile communication system according to an embodiment of the present disclosure.

FIG. 7 illustrates an operating process of a reference signal receiving apparatus in a microwave band-beam forming mobile communication system according to an embodiment of the present disclosure.

Referring to FIG. 7, the reference signal receiving apparatus receives beam pattern measurement window indication information from a reference signal transmitting apparatus, and determines a beam pattern measurement window through which the reference signal receiving apparatus receives based on the received beam pattern measurement window indication information at operation 711. The operation of receiving the beam pattern measurement window indication information from the reference signal transmitting apparatus, and determining the beam pattern measurement window based on the beam pattern measurement window indication information in the reference signal receiving apparatus is performed in the manner described with reference to FIGS. 1 to 5 and a description thereof will be omitted herein.

The reference signal receiving apparatus receives a reference signal based on the determined beam pattern measurement window to measure a channel quality at operation 713. The operation of receiving the reference signal based on the determined beam pattern measurement window to measure the channel quality is performed in the manner described with reference to FIGS. 1 to 5 and a description thereof will be omitted herein.

The reference signal receiving apparatus determines an analog beam pattern which the reference signal receiving apparatus prefers based on the measured channel quality at operation 715. The operation of determining the analog beam pattern which the reference signal receiving apparatus prefers based on the measured channel quality is performed in the manner described with reference to FIGS. 1 to 5 and a description thereof will be omitted herein.

The reference signal receiving apparatus generates channel quality information based on the measured channel quality and feeds back the generated channel quality information to the reference signal transmitting apparatus at operation 717. The operation of generating the channel quality information based on the measured channel quality and feeding back the generated channel quality information to the reference signal transmitting apparatus is performed in the manner described with reference to FIGS. 1 to 5 and a description thereof will be omitted herein.

Although FIG. 7 illustrates an operating process of a reference signal receiving apparatus in a microwave band-beam forming mobile communication system according to an embodiment of the present disclosure, various changes could be made to FIG. 7. For example, although shown as a series of operations, various operations in FIG. 7 could overlap, occur in parallel, occur in a different order, or occur multiple times.

An operating process of a reference signal receiving apparatus in a microwave band-beam forming mobile communication system according to an embodiment of the present disclosure has been described with reference to FIG. 7, and an inner structure of a reference signal transmitting apparatus in a microwave band-beam forming mobile communication system according to an embodiment of the present disclosure will be described with reference to FIG. 8.

Figure 8:
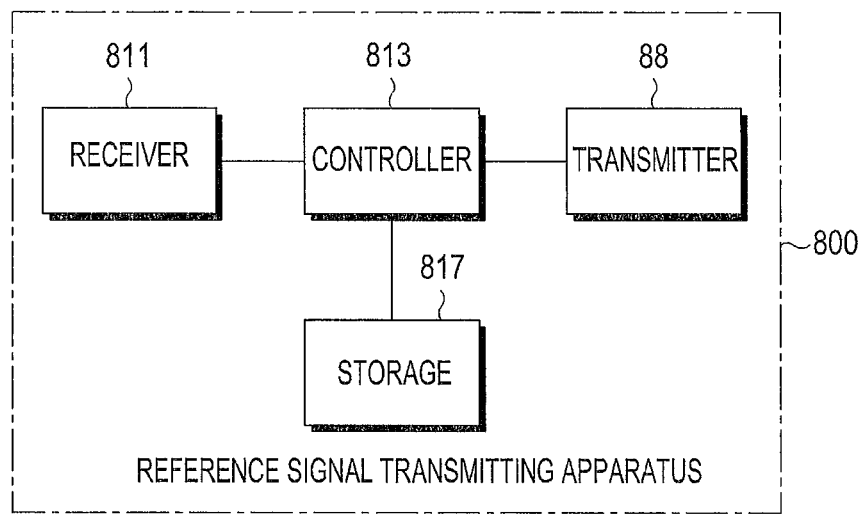
FIG. 8 illustrates a block diagram of an inner structure of a reference signal transmitting apparatus in a microwave band-beam forming mobile communication system according to an embodiment of the present disclosure.

FIG. 8 illustrates a block diagram of an inner structure of a reference signal transmitting apparatus in a microwave band-beam forming mobile communication system according to an embodiment of the present disclosure.

Referring to FIG. 8, a reference signal transmitting apparatus 800 includes a receiver 811, a controller 813, a transmitter 815, and a storage 817.

The controller 813 controls the overall operation of the reference signal transmitting apparatus 800. More particularly, the controller 813 controls the reference signal transmitting apparatus 800 to perform an operation related to an operation of transmitting beam pattern measurement window indication information and a reference signal and receiving channel quality information. The operation related to the operation of transmitting the beam pattern measurement window indication information and the reference signal, and receiving the channel quality information is performed in the manner described with reference to FIGS. 1 to 5 and a description thereof will be omitted herein.

The receiver 811 receives various signals, and the like from a reference signal receiving apparatus, and the like under a control of the controller 813. The various signals, and the like received in the receiver 811 have been described in FIGS. 1 to 5 and a description thereof will be omitted herein.

The transmitter 815 transmits various signals, and the like to the reference signal receiving apparatus, and the like under a control of the controller 813. The various signals, and the like transmitted in the transmitter 815 have been described in FIGS. 1 to 5 and a description thereof will be omitted herein.

The storage 817 stores the various signals, and the like received in the receiver 811, various data necessary for the operation of the reference signal transmitting apparatus 800, e.g., information related to the operation related to the operation of transmitting the beam pattern measurement window indication information and the reference signal, and receiving the channel quality information, and the like.

While the receiver 811, the controller 813, the transmitter 815, and the storage 817 are shown in FIG. 8 as separate units, it is to be understood that this is merely for convenience of description. In other words, two or more of the receiver 811, the controller 813, the transmitter 815, and the storage 817 may be incorporated into a single unit.

An inner structure of a reference signal transmitting apparatus in a microwave band-beam forming mobile communication system according to an embodiment of the present disclosure has been described with reference to FIG. 8, and an inner structure of a reference signal receiving apparatus in a microwave band-beam forming mobile communication system according to an embodiment of the present disclosure will be described with reference to FIG. 9.

Figure 9:
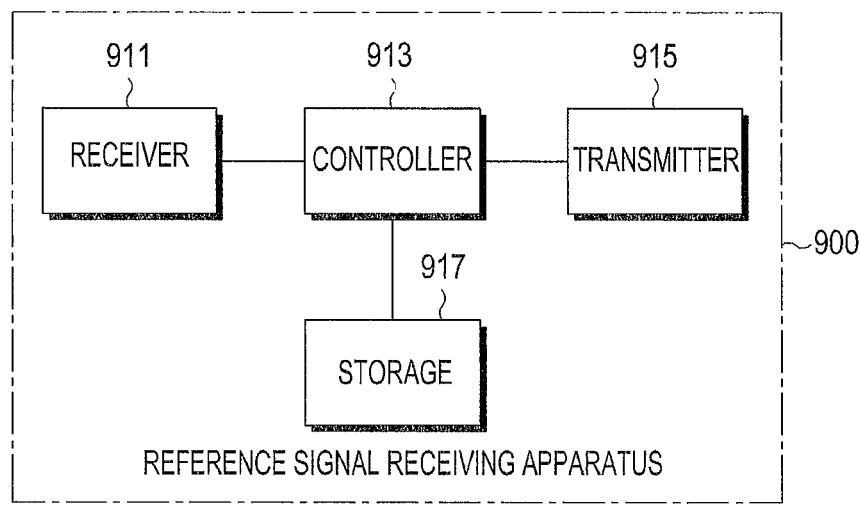
FIG. 9 illustrates a block diagram of an inner structure of a reference signal receiving apparatus in a microwave band-beam forming mobile communication system according to an embodiment of the present disclosure.

FIG. 9 illustrates a block diagram of an inner structure of a reference signal receiving apparatus in a microwave band-beam forming mobile communication system according to an embodiment of the present disclosure.

Referring to FIG. 9, a reference signal receiving apparatus 900 includes a receiver 911, a controller 913, a transmitter 915, and a storage 917.

The controller 913 controls the overall operation of the reference signal receiving apparatus 900. More particularly, the controller 913 controls the reference signal receiving apparatus 900 to perform an operation related to an operation of receiving beam pattern measurement window indication information and a reference signal, measuring channel quality, and transmitting channel quality information. The operation related to the operation of receiving the beam pattern measurement window indication information and the reference signal, measuring the channel quality, and transmitting the channel quality information is performed in the manner described with reference to FIGS. 1 to 5 and a description thereof will be omitted herein.

The receiver 911 receives various signals, and the like from a reference signal transmitting apparatus, and the like under a control of the controller 913. The various signals, and the like received in the receiver 911 have been described in FIGS. 1 to 5 and a description thereof will be omitted herein.

The transmitter 915 transmits various signals, and the like to the reference signal transmitting apparatus, and the like under a control of the controller 913. The various signals,
and the like transmitted in the transmitter 915 have been described in FIGS. 1 to 5 and a description thereof will be omitted herein.

The storage 917 stores the various signals, and the like received in the receiver 911, various data necessary for the operation of the reference signal receiving apparatus 900, e.g., information related to the operation related to the operation of receiving the beam pattern measurement window indication information and the reference signal, measuring the channel quality, and transmitting the channel quality information, and the like.

While the receiver 911, the controller 913, the transmitter 915, and the storage 917 are shown in FIG. 9 as separate units, it is to be understood that this is merely for convenience of description. In other words, two or more of the receiver 911, the controller 913, the transmitter 915, and the storage 917 may be incorporated into a single unit.

In the present disclosure, a UE may be a portable electronic device such as a mobile telephone, a personal digital assistant (PDA), a navigation device, a digital broadcasting receiver, a portable multimedia player (PMP), and the like.

As is apparent from the foregoing description, an embodiment of the present disclosure enables to transmit/receive a reference signal thereby adaptively measuring a channel quality in a wireless communication system supporting a beam forming scheme.

An embodiment of the present disclosure enables to transmit/receive a reference signal thereby adaptively feeding back a channel quality in a wireless communication system supporting a beam forming scheme.

An embodiment of the present disclosure enables to transmit/receive a reference signal thereby feeding back a channel quality by considering a channel quality change of a reference signal receiving apparatus in a wireless communication system supporting a beam forming scheme.

An embodiment of the present disclosure enables to transmit/receive a reference signal by considering a UE environment in a wireless communication system supporting a beam forming scheme.

An embodiment of the present disclosure enables to transmit/receive a reference signal in a wireless communication system supporting a beam forming scheme thereby a reference signal transmitting apparatus or a reference signal receiving apparatus adaptively determines a beam pattern measurement window.

Certain aspects of the present disclosure may also be embodied as computer readable code on a computer readable recording medium. A computer readable recording medium is any data storage device that can store data, which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable read only memory (ROM), a memory, for example, a random access memory (RAM, a memory chip, a memory device, or a memory integrated circuit (IC), or an optically or magnetically recordable non-transitory machine-readable, e.g., computer-readable, storage medium, e.g., a compact disk (CD), a digital versatile disk (DVD), a magnetic disk, or a magnetic tape. A method and apparatus according to an embodiment of the present disclosure may be implemented by a computer or a mobile terminal that includes a controller and a memory, and the memory may be an example of a non-transitory machine-readable, e.g., computer-readable, storage medium suitable to store a program or programs including instructions for implementing various embodiments of the present disclosure.

The present disclosure may include a program including code for implementing the apparatus and method as defined by the appended claims, and a non-transitory machine-readable, e.g., computer-readable, storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a contents protect method which has been already installed, information necessary for the contents protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting reference signals by a transmitting apparatus comprising a plurality of beams in a wireless communication system, the method comprising:
   identifying, based on information related to a receiving apparatus, each of a first time interval to which a first subset is allocated and a second time interval to which a second subset is allocated, wherein the first subset comprises a number of beams selected to support a service coverage of the plurality of beams from the plurality of beams, and the second subset comprises a number of other beams selected to support the service coverage from the plurality of beams;
   transmitting at least one reference signal on the first subset during first time interval and on the second subset during the second time interval;
   receiving, from the receiving apparatus, channel quality information measured based on the at least one reference signal;
   obtaining a speed of the receiving apparatus from the information;
   when the speed is greater than a threshold, allocating the first time interval or the second time interval to the receiving apparatus, and transmitting, to the receiving apparatus, information indicating the allocated first time interval or the second time interval; and
   when the speed is less than the threshold, allocating the first time interval and the second time interval to the receiving apparatus, and transmitting, to the receiving apparatus, information indicating the allocated first time interval and the second time interval.

2. The method of claim 1, further comprising:
   broadcasting information indicating the first time interval and the second time interval.

3. The method of claim 2, wherein the information comprises a data type indicating one of a real-time service data type, a non-real-time service data type, a user data type, and a non-user data type.

4. A method for receiving reference signals by a receiving apparatus in a wireless communication system, the method comprising:
   receiving, from a transmitting apparatus, information to measure channel quality information;
   identifying, based on the received information, each of a first time interval to which a first subset is allocated and a second time interval to which a second subset is allocated, wherein the first subset comprises a number of beams selected to support a service coverage of a plurality of beams from the plurality of beams, and the second subset comprises a number of other beams selected to support the service coverage from the plurality of beams;
   when the first time interval or the second time interval is identified, receiving, from the transmitting apparatus, at least one reference signal on the first subset during the identified first time interval or the second subset during the identified second time interval;
   when the first time interval and the second time interval is identified, receiving, from the transmitting apparatus, the at least one reference signal on the first subset during the first time interval and the second subset during the second time interval;
   measuring a channel quality based on the at least one reference signal; and
   transmitting, to the transmitting apparatus, the channel quality information related to the channel quality,
   wherein the identifying comprises:
      obtaining a speed of the receiving apparatus;
      when the speed is greater than a threshold, transmitting, to the transmitting apparatus, information indicating a time interval to receive the at least one reference signal is the first time interval or the second time interval; and
      when the speed is less than the threshold, transmitting, to the transmitting apparatus, information indicating the time interval comprises the first time interval and the second time interval.

5. The method of claim 4, wherein the information comprises a data type indicating one of a real-time service data type, a non-real-time service data type, a user data type, or a non-user data type.

6. A transmitting apparatus for transmitting reference signals in a wireless communication system, the transmitting apparatus comprising:
   a controller configured to identify, based on information related to a receiving apparatus, each of a first time interval to which a first subset is allocated and a second time interval to which a second subset is allocated, wherein the first subset comprises a number of beams selected to support a service coverage of a plurality of beams from the plurality of beams, and the second subset comprises a number of other beams selected to support the service coverage from the plurality of beams; and a transceiver configured to transmit at least one reference signal on the first subset-during the first time interval and on the second subset during the second time interval and receiving, from receiving apparatus, channel quality information measured based on the at least one reference signal, wherein the controller is further configured to:
 obtain a speed of the receiving apparatus from the information,
 when the speed is greater than a threshold, allocate the first time interval or the second time interval to the receiving apparatus, and control the transceiver to transmit, to the receiving apparatus, information indicating the allocated first time interval or the second time interval, and
 when the speed is less than the threshold, allocate the first time interval and the second time interval to the receiving apparatus, and control the transceiver to transmit, to the receiving apparatus, information indicating the allocated first time interval and the second time interval.

7. The transmitting apparatus of claim 6, wherein the information comprises a data type indicating one of a real-time service data type, a non-real-time service data type, a user data type, or a non-user data type.

8. The transmitting apparatus of claim 6, wherein the transceiver is configured to broadcast information indicating the first time interval and the second time interval.

9. A receiving apparatus for receiving reference signals in a wireless communication system, the receiving apparatus comprising:
 a transceiver configured to receive, from a transmitting apparatus, information to measure channel quality information; and
 a controller configured to identify, based on the received information, each of a first time interval to which a first subset is allocated and a second time interval to which a second subset is allocated, wherein the first subset comprises a number of beams selected to support a service coverage of a plurality of beams from the plurality of beams, and the second subset comprises a number of other beams selected to support the service coverage from the plurality of beams,
 when the first time interval or the second time interval is identified, control the transceiver to receive, from the transmitting apparatus, at least one reference signal on the first subset during the identified first time interval or the second subset during the identified second time interval,
 when the first time interval and the second time interval is identified, control the transceiver to receive, from the transmitting apparatus, the at least one reference signal on the first subset during the first time interval and the second subset during the second time interval,
 measure a channel quality based on the at least one reference signal,
 control the transceiver to transmit, to the transmitting apparatus, the channel quality information related to the channel quality,
 obtain a speed of the receiving apparatus,
 when the speed is greater than a threshold, control the transceiver to transmit, to the transmitting apparatus, information indicating a time interval to receive the at least one reference signal is the first time interval or the second time interval, and
 when the speed is less than the threshold, control the transceiver to transmit, to the transmitting apparatus, information indicating the time interval comprises the first time interval and the second time interval.

10. The receiving apparatus of claim 9, wherein the information comprises a data type indicating one of a real-time service data type, a non-real-time service data type, a user data type, or a non-user data type.

* * * * *